US012720142B2

(12) United States Patent
Ding et al.

(10) Patent No.: US 12,720,142 B2
(45) Date of Patent: Aug. 25, 2026

(54) SYSTEM AND METHOD FOR DETERMINATION AND RECONSTRUCTION OF VIDEO AND ENTERTAINMENT SESSIONS IN PACKET DATA NETWORKS

(71) Applicant: AT&T Intellectual Property I, L.P., Atlanta, GA (US)

(72) Inventors: Yuan Ding, Plainsboro, NJ (US); Natalia Schenck, Dallas, TX (US); Vinay Sharma, Queens Village, NY (US); Hao Kang, Plano, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 18/966,352

(22) Filed: Dec. 3, 2024

(65) Prior Publication Data

US 2025/0097503 A1 Mar. 20, 2025

Related U.S. Application Data

(62) Division of application No. 17/901,972, filed on Sep. 2, 2022, now Pat. No. 12,200,286.

(51) Int. Cl.
*H04N 21/647* (2011.01)
*H04N 21/218* (2011.01)
(Continued)

(52) U.S. Cl.
CPC ....... *H04N 21/4126* (2013.01); *H04N 21/251* (2013.01); *H04N 21/44204* (2013.01); *H04N 21/6131* (2013.01)

(58) Field of Classification Search
None
See application file for complete search history.

(56) References Cited

U.S. PATENT DOCUMENTS 10,623,788 B2 4/2020 Sivaraj et al.
2012/0092992 A1* 4/2012 Pappas ................ H04L 12/4662 370/235

(Continued)

*Primary Examiner* — Brian T Pendleton
*Assistant Examiner* — Jean D Saint Cyr
(74) *Attorney, Agent, or Firm* — Guntin & Gust, PLC; Kenneth S. Kwan

(57) ABSTRACT

Aspects of the subject disclosure may include, for example, detecting a plurality uplink data packets on a network, the plurality of uplink data packets conveying application protocol messages from an application on a mobile device to an application server providing a service to the application on the mobile device over the network; providing data packets of the plurality uplink data packets to a machine learning model, the machine learning model trained to identify respective application protocol messages from the data packets; receiving from the machine learning model an indication that a start video download application protocol message has been identified by the machine learning model, the start video download application protocol message requesting initiation of a video download to the application on the mobile device from the application server; detecting a plurality of downlink data packets on the network, the plurality of downlink data packets conveying video content data to the mobile device in response to the start video download application protocol message; comparing a watch time for displaying the video content data on the mobile device by the application and a download data time; and determining a stall event has occurred based on the comparing. Other embodiments are disclosed.

20 Claims, 9 Drawing Sheets

(51) Int. Cl.

| | |
|---|---|
| ***H04N 21/231*** | (2011.01) |
| ***H04N 21/234*** | (2011.01) |
| ***H04N 21/2347*** | (2011.01) |
| ***H04N 21/24*** | (2011.01) |
| ***H04N 21/25*** | (2011.01) |
| ***H04N 21/41*** | (2011.01) |
| ***H04N 21/414*** | (2011.01) |
| ***H04N 21/434*** | (2011.01) |
| ***H04N 21/44*** | (2011.01) |
| ***H04N 21/442*** | (2011.01) |
| ***H04N 21/61*** | (2011.01) |

(56) References Cited

U.S. PATENT DOCUMENTS

2019/0334794 A1* 10/2019 Halepovic ............... H04L 43/20
2019/0394527 A1 12/2019 Chandrasekhar et al.
2021/0092036 A1 3/2021 Jain et al.
2024/0080511 A1 3/2024 Ding et al.

* cited by examiner

220

300

CLOUD COMPUTING ENVIRONMENTS 375
VIRTUALIZED NETWORK FUNCTION CLOUD 325
VNE 330
VNE 332
VNE 334
TRANSPORT LAYER 350
BROADBAND ACCESS 110
VOICE ACCESS 130
WIRELESS ACCESS 120
MEDIA ACCESS 140
CONTENT SOURCES 175

600

SYSTEM AND METHOD FOR DETERMINATION AND RECONSTRUCTION OF VIDEO AND ENTERTAINMENT SESSIONS IN PACKET DATA NETWORKS

CROSS REFERENCE TO RELATED APPLICATION

This application is a divisional of and claims priority to U.S. patent application Ser. No. 17/901,972 filed on Sep. 2, 2022. All sections of the aforementioned application are incorporated herein by reference in their entirety.

FIELD OF THE DISCLOSURE

The subject disclosure relates to determination and reconstruction of video and entertainment sessions in packet data networks that employ transport layer encryption.

BACKGROUND

Some providers of network devices have begun encrypting data communicated between a user's network device and a web server or other network device. While useful for confidentiality and security of the user, such a process limits access of network operators to current network usage data and the ability to determine network metrics to monitor and improve network performance.

BRIEF DESCRIPTION OF THE DRAWINGS

Reference will now be made to the accompanying drawings, which are not necessarily drawn to scale, and wherein.

DETAILED DESCRIPTION

Figure 1:
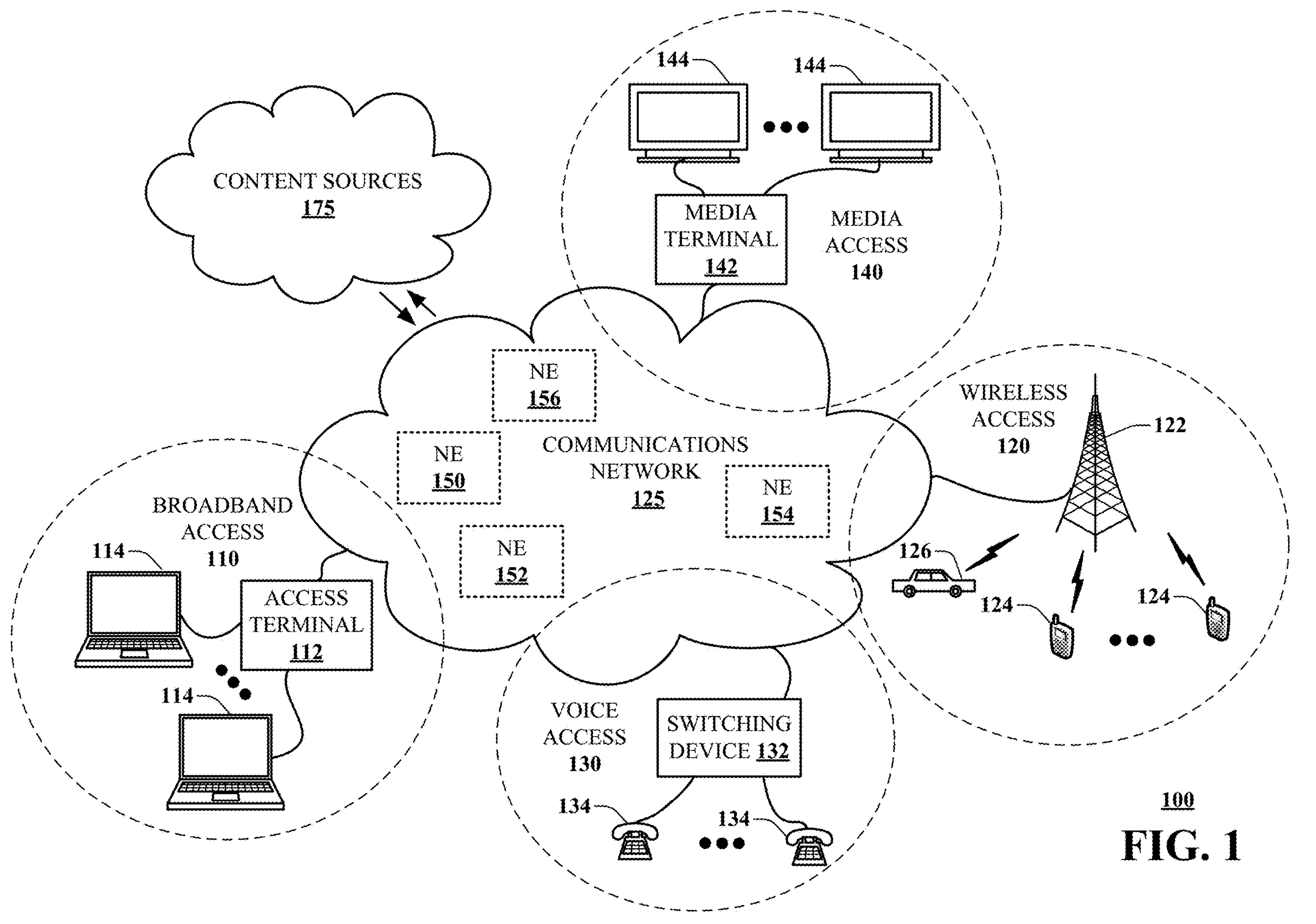
FIG. 1 is a block diagram illustrating an exemplary, non-limiting embodiment of a communications network in accordance with various aspects described herein.

The subject disclosure describes, among other things, illustrative embodiments for identifying a stall event during delivery of a content item over a network to an application operating on a mobile device or other network device. A machine learning module is trained to identify application protocol messages between the mobile device and an application server providing the content item, even when the application protocol messages are encrypted so that only the application server can read the messages from the application on the mobile device. The machine learning model identifies a command from the application on the mobile device to start downloading content of the content item. A watch time, corresponding the time of playback of the content item on the mobile device, is compared with an amount of data downloaded in streaming segments from the application server to the mobile device and a stall event is identified from the comparison. By collecting data about stall events, a network operator can improve a quality of experience for users of the network by reducing the likelihood of future stall events occurring. Other embodiments are described in the subject disclosure.

One or more aspects of the subject disclosure include detecting a plurality uplink data packets on a network, the plurality of uplink data packets conveying application protocol messages from an application on a mobile device to an application server providing a service to the application on the mobile device over the network; providing data packets of the plurality uplink data packets to a machine learning model, the machine learning model trained to identify respective application protocol messages from the data packets; receiving from the machine learning model an indication that a start video download application protocol message has been identified by the machine learning model, the start video download application protocol message requesting initiation of a video download to the application on the mobile device from the application server; detecting a plurality of downlink data packets on the network, the plurality of downlink data packets conveying video content data to the mobile device in response to the start video download application protocol message; comparing a watch time for displaying the video content data on the mobile device by the application and a download data time; and determining a stall event has occurred based on the comparing.

One or more aspects of the subject disclosure include detecting uplink packets in a network, the uplink packets conveying application protocol requests from an application on a mobile device to an application server, the application server providing a service to the application on the mobile device over the network, wherein at least some of the uplink packets are encrypted to be readable only by the application server, detecting downlink packets in the network, the downlink packets conveying content data from the application server to the application on the mobile device for playback of a content item on the mobile device and reconstructing a session lifecycle into a set of application protocol messages between the application on the mobile device and the application server, wherein the reconstructing is based on the uplink packets and the downlink packets. Aspects of the subject disclosure further include identifying a stall event in the session lifecycle, wherein the stall event corresponds to an interruption of the playback of the content item on the mobile device due to insufficient content data conveyed from the application server to the application on the mobile device, and redistributing network resources to reduce a likelihood of a future stall event, wherein the redistributing is responsive to the identifying the stall event.

One or more aspects of the subject disclosure include receiving a plurality of uplink data packets at a network element from a mobile device over a network, the uplink data packets forming one or more application protocol messages from an application on a mobile device to an application server which provides content to the application on the mobile device, providing at least some of the uplink data packets to a machine learning model, the machine learning model configured to identify respective application protocol messages from the data packets, and receiving an indication of a command in an application protocol message from the application on the mobile device to the application server. Aspects of the subject disclosure further include determining a watch time for displaying a video content item by the application on the mobile device, wherein the determining the watch time is responsive to receiving from the machine learning model an indication of a command to start video download, determining an amount of content downloaded to the mobile device by the application server, and determining a stall event has occurred, wherein the determining the stall event has occurred is responsive to a comparison of the watch time and the amount of content downloaded to the mobile device.

Referring now to FIG. 1, a block diagram is shown illustrating an example, non-limiting embodiment of a system 100 in accordance with various aspects described herein. For example, system 100 can facilitate in whole or in part identifying a stall event during content download to a user device through the system 100 and modifying aspects of the network to reduce likelihood of future stall events. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
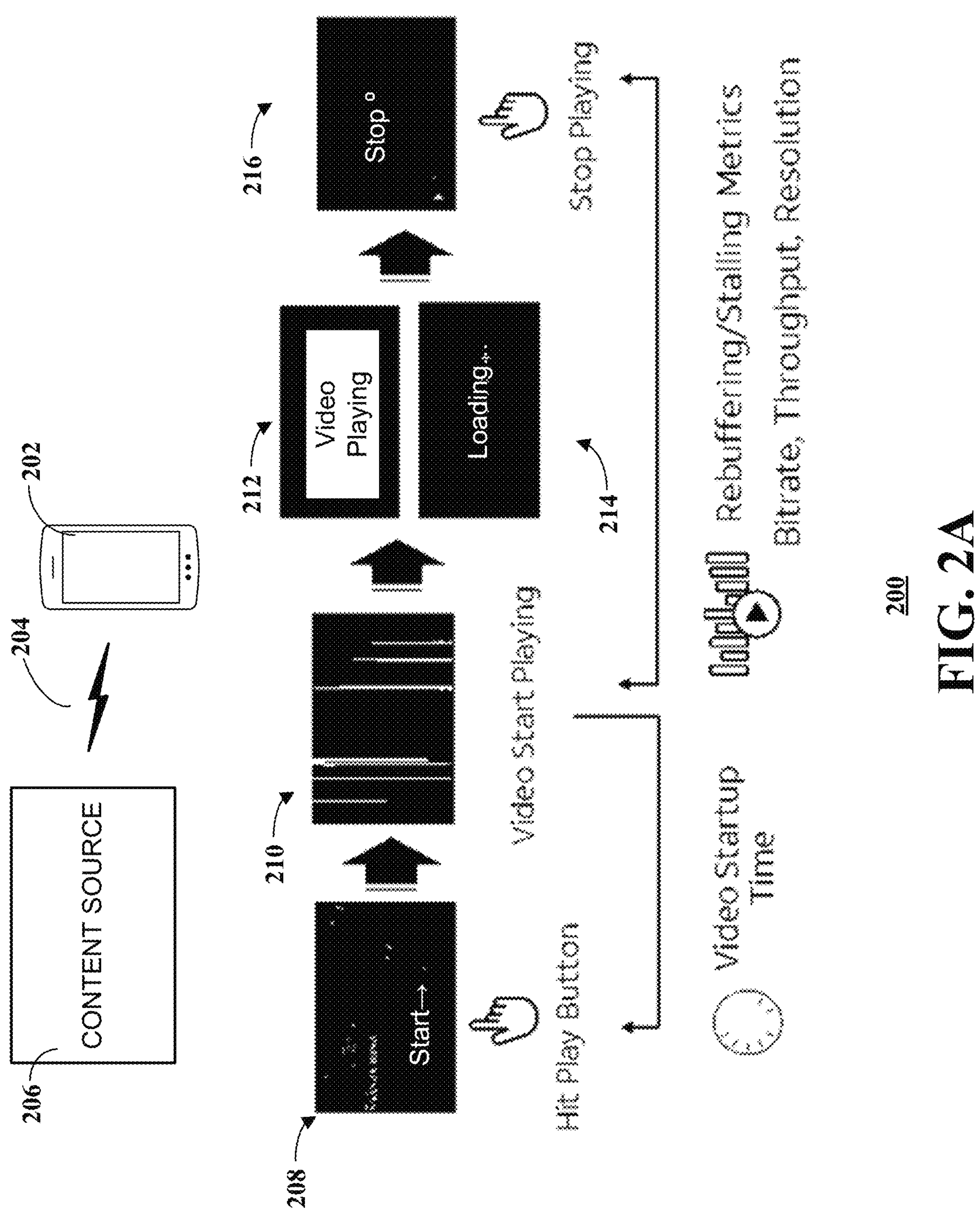
FIG. 2A is a block diagram illustrating an example, non-limiting embodiment of a method of operation of a user device on a system functioning within the communications network of FIG. 1 in accordance with various aspects described herein.

FIG. 2A is a block diagram illustrating an example, non-limiting embodiment of a method 200 of operation of a user device on a system functioning within the communications network 125 of FIG. 1 in accordance with various aspects described herein. The method 200 relates to display of content on a user device 202 such as a smartphone, a tablet computer, a personal computer, a connected television or a gaming console. The user device 202 receives content over a network connection 204 from a content source 206. The network connection 204 may include any suitable wireline or wireless network, or combinations thereof including for example broadband access 110, wireless access 120 and media access 140 (FIG. 1). The network connection 204 may include private networks such as networks operated by a network provider and public networks such as the public internet. The content source 206 may provide audio, video, graphics, text or other media, or combinations of these. The audio, video or other content may be encoded in any suitable manner. For example, video may be encoded as MP4 video, or according to any other encoding standard. The content source 206 may be any suitable source of content such as an online streaming service provided by a service provider such as on a subscription basis or for a fee.

In a particular example, a user of the user device 202 selects and receives over the network connection 204 a content item such as a video file of a television program or film. The content item is streamed over the network connection 204 from the content source 206 to the user device 202. For example, the content item may be an over-the-top (OTT) content item delivered by an internet service provider (ISP) to a premises or other location of a user with the user device 202. The user device 202 may have an application program or app 203 installed that cooperates with the content source 206 to request and receive segments or chunks of video from the content source 206. Each segment may include, for example, 10 seconds of played back video. Other segment sizes may be used. Segments of data receive at the user device may be stored in a buffer memory 205 of the user device 202. The user device 202, under control of the app, may present a user interface for controlling selection and display of the content item. Further, the user device 202 may have a web browser or other network access technology to select and receive the content item over the network connection 204. In another example, the content item may include a video game in which the user participates using a gaming console or other suitable device to interact with a gaming system associated with the content source 206 and with other gamers over a network including the network connection 204.

The method 200 includes a first operation 208 wherein the user or the user device 202 initiates delivery of the content item. In the illustrated example, the user presses a play button or other actuator to initiate downloading of the content item over from the content source 206 over the network connection 204 to the user device 202. In other examples, play of the content item may begin automatically or due to some other action or interaction at the user device 202. In a streaming session, some portion of the content item is downloaded over the network connection. The portion of the content item that is transmitted to the user device 202 may be stored in a buffer memory and played back to the user interface of the user device 202. As the buffer memory drains, the user device calls for more content from the content source 206. The amount of the content item that is streamed and buffered may depend on a number of circumstances including network congestion, size of the buffer memory, data transfer rate on the network, and other factors. At step 210, the video or other content item begins playing on the user device 202.

The time when the user actuates the play button on the user device 202, or other action is taken to request playback of the content item, may be considered the start time. The time when the content item begins playing on the user device 202 may be considered the start of play time. As indicated in FIG. 2A, a time delay between the start time and the start of play time may be termed the video startup time.

A network operator which provides all or a portion of the network connection 204 to the user device 202 may monitor parameters such as the video startup time. In a typical example, the network provider may wish to minimize the video startup time to improve the user's experience. The user would prefer to initiate playback and have the playback begin substantially immediately, with minimal delay. Delay may occur because of network issues such as congestion and the network provider may wish to minimize network congestion and therefore delay. For example, the network provider may opt to reconfigure a portion of the network connection 204 to provide additional capacity between the content source 206 and the user device 202.

At step 212, playback of the content item continues. As noted, the user device may use a buffer to receive and store a number of video segments of the content item. The video data currently needed for audio and video playback may be drawn from the buffered data. For example, the user device 202 or a video playback app running on the user device 202 may request content data of the content item corresponding to 60 seconds of playback time. The requested content data is communicated from the content source 206 over the network connect 204 and stored in the buffer memory. As the buffer memory is depleted, the user device 202 may request more content data from the content source. The additional content data will be delivered with a goal of keeping the buffer memory at least full enough to continue playback without interruption.

In step 214, a playback interruption occurs, or a video stall occurs. For the user viewing the content item, this may occur as paused video or as a spinning wheel or other graphical item displayed on the user interface in place of the content item. The playback interruption of step 214 may be due to a variety of causes. In some instances, the playback interruption may be due to a network problem on the network connection 204 such as network congestion, a failure of a network component or other reasons. If the user device 202 is a mobile device such as a smartphone, the user device 202 may move from an area of good coverage with a strong received signal to an area with poor coverage with a weak received signal or increased error rate. The poor coverage can reduce the data rate or reliability of download of video segments or other content. The playback interruption may continue until additional content data is received at the user device 202 and rebuffered. The additional content data may then be used to resume playback.

Generally, so long the download speed is greater than the consumption speed, the video playback will never stall. Download speed and consumption speed may be measured in any suitable manner or any suitable units such as megabytes per second (MBps) or frames or seconds of video playback. A stall will generally only occur if download speed is lower than or slower than the video playback rate.

The network operator which provides all or a portion of the network connection 204 to the user device 202 may monitor parameters such as rebuffering metrics or stalling metrics. The network operator may monitor key performance indicators for the network such as bitrate, data throughput on the network and resolution. Such information may be used to monitor network performance and user experience.

At step 216, the user of the user device terminates viewing the content item. This may happen for any reason, perhaps because the content item has completed. This may be detected by the network operator detecting a command from the user device 202 to the content source 206 to end the streaming session.

Thus, there is a set of events detectable by the network operator. that occur over the course of video playback. First, there is a time point when the user clicks a play button in an over-the-top video application or otherwise initiates the streaming or content delivery session. Second, there is a time point when the playback begins, i.e., the user starts watching the actual content. Third, there is a time point of when the user stops playing the video or other content item. Further, sometimes during the playback, rebuffering or stalling events occur, such as times when playback stalls due to network congestion or some other conditions that can cause slowing down of content loading.

Knowing when such rebuffering or stalling events occur enable an internet service provider or other network operator to generate video Quality of Experience (QoE) metrics. Such QoE metrics may include time delay metrics such as video startup time. Such QoE metrics may include network performance metrics such as throughput per segment, average bitrate, video resolution. Such QoE metrics may include metrics related to content playout, such as how many stalling events occurred during playback and how long they were relative to the total playback time.

However, as network usage has increased, it has become more difficult for network operators to collect information about performance in their network and therefore more difficult to determine user experience including QoE metrics. In a first example, in the past decade, device manufacturers have steadily increased the use of encryption to protect customer data. For example, Apple Inc., a manufacturer of mobile devices and laptop computers recently announced a new internet privacy service called Private Relay which ensures, when browsing with the company's Safari browser, that all traffic leaving a mobile device is encrypted. As a result, no one between the mobile device and a web server can access and read the web traffic. This includes network operators and internet service providers (ISPs).

In a second example, different device providers or content providers may provide different download schemes for content items. This may be done to optimize data transfer for the device or content provider. For example, some providers download 30 seconds of video data at a time until rebuffering is requested by the user device. Some other providers only download 10 seconds of video data until rebuffering is requested. The amount of data downloaded is not constant among different providers.

For network operators and ISPs, hidden data diminishing the ability to access Internet usage data makes it difficult to do network analytics for primary operator use cases. Such use cases include fraud identification, network management and optimizations with capital forecasting, informative customer usage reporting. Other use cases include revenue generating use cases which are explicitly permitted by a user via an opt-in operation. An example of such an opt-in use case is providing relevant advertising. If internet traffic between the user device 202 and a content source 206 over a network connection is hidden by encryption or in some other manner, less and less data is available to the network operator or ISP. For the network operator or ISP, sparse data can lead to incomplete or inaccurate data analytics. Incomplete or inaccurate data analytics can result in flawed forecasting and usage reporting used for network and product planning and diminished monetization opportunities and revenues.

Accordingly, there is an increasing need for network operators and ISPs to develop advanced network data analytics methods to regain visibility into encrypted communication and to ensure ability to deliver good customer experience.

In embodiments, a system and method may be implemented which reconstruct, in near real time, a sequence of application events that make up subscribers' experience with content items such as video and entertainment services. The system and method make use of an ISP's existing use of probes in the network. Active probes may be used to collect information about network topology and function. The network probes are typically used to monitor network health, troubleshoot problems, and so forth. Many ISPs already deploy such network probes. Transport-layer encryption used by some device makers hides the content but does not hide the network characteristics, such as the number of bits transmitted in a given time interval. Even if the data flow is encrypted at the transport layer, e.g., using transport layer security (TLS), the packets' sizes and their timestamps showing times of packet arrival are visible and known to the network probes. This is true even without any use of deep packet inspection (DPI). Embodiments of the system and method in accordance with aspects described herein use data packets' fundamental characteristics such as packet size, relative time between packets, and duration as features in machine learning models to probabilistically identify session events which correspond to user experience.

As illustrated in FIG. 2A, there is a set of events that occur over the course of video playback. The application operating on the user device 202 exchanges messages with the server or other equipment of the content source 206. The exchanged messages may be encrypted and control the start and stop of video playback and other events. Some of these events may be characterized as:

1. Time point of when user clicks a play button in an over-the-top video application or start time.
2. Time point of when the playback begins, i.e., the user starts watching the actual content.
3. Time point of when the user stops playing video or stop time.

As further illustrated in FIG. 2A, sometimes during the video playback, rebuffering or stalling events occur. That is, there are times when playback at the user device 202 stalls due to network congestion or some other conditions that can cause slowing down of content loading from a content server the content source 206 to the user device 202 over the network connection 204. The network operator may collect information and statistics about a plurality of such stall events over a set period of time, such as one week or one month. The information and statistics may be organized according to a network portion of an overall mobility network, such as a particular base station or subnetwork served by a group of base stations. Knowing when these events occur enables an ISP or other network provider to generate video Quality of Experience (QoE) metrics. In embodiments, such video QoE metrics may include video startup time, or the time between the start time when user clicks a play button and when the user starts seeing the actual content; number of segments downloaded to the user device; throughput per segment; average bitrate; video resolution; and metrics related to content playout, such as how many stalling events occurred during playback and a duration or average duration of the stalling events relative to the total playback time.

These events may be identified when a session lifecycle is reconstructed into a set of Application protocol messages exchange from data packets flowing between the application and the server. These messages are consistent and cause a repeatable set of data packets with specific characteristics. The repeated set of data packets may be recognized by a machine learning model or other artificial intelligence component based in part on the specific characteristics of the set of data packets.

Figure 2B:
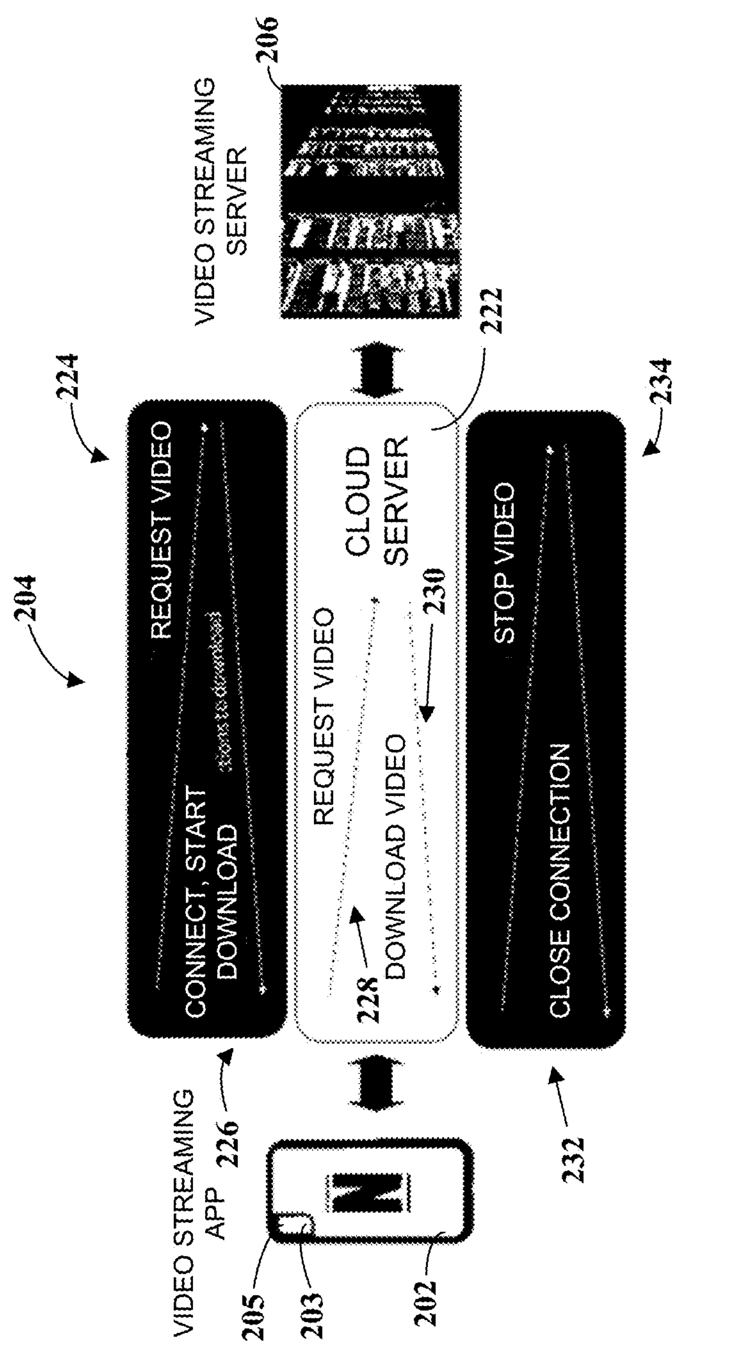
FIG. 2B depicts an illustrative embodiment of a video session message flow in accordance with various aspects described herein.

FIG. 2B depicts an illustrative embodiment of a video session message flow 220 in accordance with various aspects described herein. In FIG. 2B, a user device 202 communicates over a network connection 204 with a video streaming server or other content source 206. The user device can be any suitable device used by a user to consume content such as a smartphone, tablet computer, personal computer, a connected television or a gaming device. The network connection 204 can include any combination of wireline and wireless networks. The content source 206 can provide any suitable content such as streaming files for video and audio and gaming.

In this example embodiment, the network connection 204 includes a cloud server 222. The cloud server 222 may be a centralized server resource that is hosted on and delivered over a network such as the public internet. The cloud server 222 may be accessed on demand by multiple users to provide one or more services to the users. The cloud server 222 may be implemented as one or more virtual network functions in which the functionality of the cloud server 222 is provided by multiple physical devices operating together as a virtual server. The cloud server 222 may be provided by a third party such as, in one example, Amazon Web Services. The cloud server 222 may operate as part of a content delivery network (CDN). A network operator may provide data communication of the network connection 204 between the user device, the cloud server 222 and the content source 206.

The message flow 220 includes a series of messages between the user device 202 and the content source 206. The messages may be sent in any suitable protocol, format or encoding. In an example, the user device 202 includes a video playback app 203 associated with the content streaming service of the content source 206. An example of such a content streaming service is Netflix. A Netflix app 203 on the user device 202 communicates using an application protocol with a Netflix server as the content source 206 to request and receive content items.

The specific messages of the message flow 220 of FIG. 2B are intended to be exemplary only. The user device 202 sends a first message 224 to the content source 206 requesting a particular content item. In the example, the user device 202 requests to view season 1, episode 1 of the video program Stranger Things. In response, at step 226, the network operator, in cooperation with network facilities such as the cloud server 222, initiates connections through the network connection 204 to create a path from content source 206 to user device 202. The network connections may be selected based on the nature of the content item to be delivered. For example, streaming video is largely a one-way delivery on a downlink to the user device 202, with little or no uplink traffic while content is streaming. Therefore, the network provider may assign suitable devices and connections to handle the expected traffic demand, along with other traffic through the network connection 204. Similarly, if the message requests initiation of an augmented reality (AR) game in which the user will interact with other users over the network connection 204, the traffic may be expected to be more balanced and the network operator may assign network elements accordingly. When the network connections are assigned, the content item is initiated. In the example, the requested video file begins streaming.

The video streaming server of the content source 206 may determine the time at which the video starts playing in any suitable manner. One technique is disclosed in U.S. Pat. No. 10,623,788, filed Mar. 23, 2018, and issued Apr. 14, 2020, which is incorporated herein in its entirety by this reference. When the video starts playing, a module for determination and reconstruction of video sessions operating on the video streaming server may start counting a watch time or the time duration of playback of the video. Also at that time, the module of the video streaming server may start counting the amount of video playback data that has been downloaded to the buffer memory, such as 10 seconds or 5 minutes in 10 second segments. This may be referred to as buffer time. The two numbers, the watch time and the buffer time, may be compared continuously by the module of the streaming server to determine whether the user device has enough video data stored in the buffer memory 205 to continue playing.

At message 228, the user device 202 reports that the content item is being received. At message 230, content source or network provider continues streaming data of the content item of interest. The content item may be downloaded isochronously in chunks such 10 or 20 seconds at a time. Chunks or segments of data are stored in a video buffer memory 205 such as the memory of the user device 202. Downloading depends on network factors such as traffic and capacity as well as the size of the video buffer memory 205. As the buffer memory 205 drains, more messages such as message 228 are communicated, requesting additional content.

At message 232, the user device 202 reports that streaming should end. This may be transmitted in response to the user pressing a Stop button on a user interface of the user device 202, or for any other appropriate reasons. At message 234, the content server confirms the end of the streaming session. The network operator may reassign network facilities assigned to the streaming session.

When video chunks are delayed in the network, the video playback application app 203 runs out of video chunks or segments downloaded from the server. This may cause stalling and buffering events. For the user viewing the video playback, this occurs as a slight delay in playback or a spinning wheel or other graphical indicator of waiting on receipt of further video content. These events may identify, with some level of confidence by comparing a time between chunks or segments to an amount of time that is expected probabilistically by trained machine learning models.

Figure 2C:
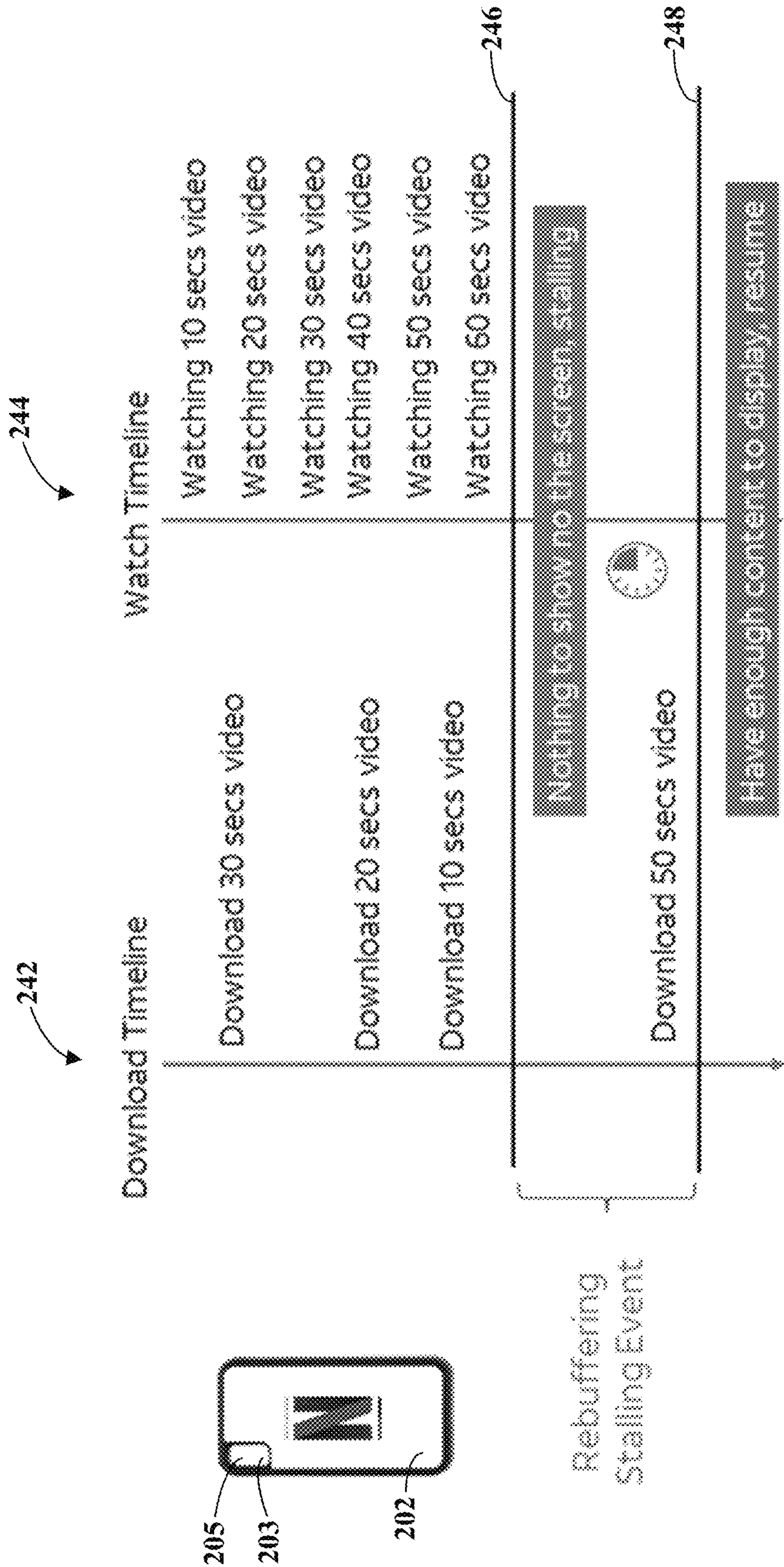
FIG. 2C depicts an illustrative embodiment of a content download process 2 in accordance with various aspects described herein.

For example, FIG. 2C depicts an illustrative embodiment of a content download process 240 in accordance with various aspects described herein. In FIG. 2C, a user device 202 has requested delivery of a content item over a network connection such as network connection 204 from a content source 206 (FIG. 2A). The user device 202 in the example runs under control of an app 203 on the user device 202. The app communicates with a server of a content delivery service such as Netflix to receive the content item.

As shown in FIG. 2C, the content item is downloaded in chunks along a download timeline 242. The download timeline 242 indicates the size of each chunk of video data received, such as 30 seconds of video data, followed by 20 seconds of video data, followed by 10 seconds of video data. Further, the content item is viewed along a watch timeline 244. The times indicated on the watch timeline 244 are cumulative or show ongoing amount of time spent viewing or otherwise consuming the content item. The watch timeline 244 measures a watch duration or the amount of playback time that has been played back on the user device. This may be measured from the video start time (FIG. 2A), for example.

At a time point 246, the download time indicates that a total of 60 seconds of video data has been downloaded in three chunks of 30 seconds, 20 seconds and 10 seconds. The video data is stored in a buffer memory 205 as the chunks of video data is received over the network connection. The buffer memory 205 stores the downloaded video data. The buffer time refers to the amount of time for video packets to accumulate on the server side of the network connection 204 before delivering to the client, user device 202. At the receiving end of the network connection 204, a longer buffer time corresponds to an allowance for more delay in the network due to congestion and other factors. Also at the time point 246, the user has viewed 60 seconds of video, marked on the watch timeline 244 in 10 second increments. The video data is drawn from the buffer memory 205 as the video data is rendered to present the content item.

Thus, at time point 246, the buffer memory 205 is empty. Sixty seconds of video data have been received and 60 seconds of video has been watched. As a result, the user device 202 is in a stall condition. The user device 202, or the app 203 which controls video playback, may display a blank screen or some other indication that the user device is waiting on delivery of additional data. The user's viewing of the content item is interrupted due to the lack of data.

At time point 248, the user device 202 receives an additional chunk of 50 seconds of video data over the network connection. After time point 248, the user device 202 has enough video data available that display of the content may resume. Normal viewing of the content item may resume unless and until a further stall occurs.

Figure 2D:
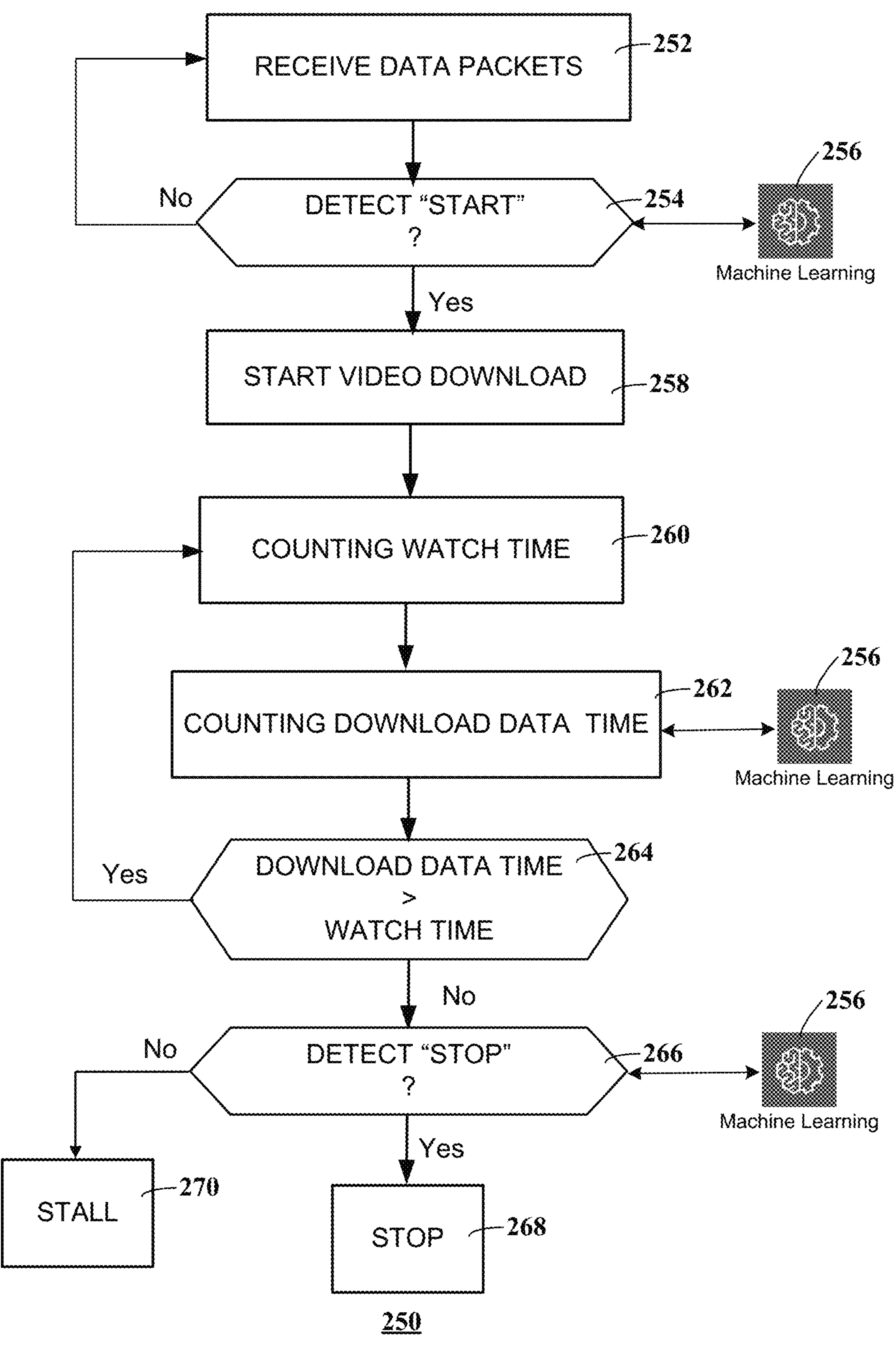
FIG. 2D depicts an illustrative embodiment of a method in accordance with various aspects described herein.

FIG. 2D depicts an illustrative embodiment of a method 250 in accordance with various aspects described herein. The method 250 may be used in a communication system to reconstruct, in near real time, a sequence of application events that make up a subscriber's experience with video and entertainment services. In an example embodiment, a subscriber or other user uses a user equipment device such as user device 202 (FIG. 2A) to request and view a content item on the user equipment device. In the exemplary embodiment, the user equipment device is a smartphone or other mobile device that connects with a radio access network such as 120 access (FIG. 1). The radio access network is in data communication over one or more networks such as communications network 125 with one or more content sources such as content sources 175 or content source 206 (FIG. 2A). The method 250 may be implemented at any network element or combination of network elements of the radio access network or other communications network between the user equipment device and the content source.

The method 250 may be initiated in any suitable manner such as by detecting data communications between the user equipment device and a network element including the contents source. The data communications may correspond to a session between the user equipment device and a content server or other content source to deliver a content item to the user equipment device. In the example, the user equipment device, the content source or both, encrypt at least some data communications between the user equipment device and the network element. In an example, all traffic leaving a user equipment device is encrypted, so that no one between the user equipment device and a web server or other network element can access and read the traffic. The method 250 enables determination or identification and reconstruction of video and entertainment sessions by the user equipment device. Video sessions may include download of a video content item such as a film or television program. Entertainment sessions may include participation in a video game including, for example, a virtual reality or augmented reality game among multiple participants. Request, retrieval and playback of the video or entertainment item may be under control of an application program or app operating on the user equipment device and cooperating with a content server in a client-server relationship. Initiation of the method 250 may follow receipt of a request for a particular video content item, entertainment content item or other content item. In this example, the user has made a request for the content item and the content source is waiting to begin delivery comma for example in response to a received start command from the user.

At step 252, the method 250 includes receiving data packets transmitted by the user equipment. In the example, the data packets are received at a radio access network from a mobile device such as a smartphone. The method may be performed at a network element such as a router or server in a core network associated with the radio access network and operated by a network provider. The data packets include a payload and control information such as addressing information and a time stamp. As noted, in the example, the data packets may be encrypted in some manner such as transport layer encryption. However, for proper routing, some control information of each data packet is kept in the clear. For example, addressing and time stamp information for the packet may be clearly readable to ensure that the packets are directed to the correct destination and reassembled in the correct order.

At step 254, the method 250 includes determining at the network element if a start command has been received from the user equipment device. In the example, the method 250 attempts to detect when the user equipment device initiates playback of a requested video file or other content item. The start command may be generated by the application operating on the user equipment device in response to actuation by a user of the user equipment device of a start function on the application, such as pressing a start button on a user interface of the user equipment device or app.

Add step 254, the network element cooperates with a machine learning model 256 to identify the start command. The method 250 uses fundamental characteristics of data packets such as packet size, relative time between packets, and packet duration as features in the machine learning model to probabilistically identify session events which correspond to user experiences. Method 250 uses machine learning to detect a pattern of packets created when certain types of application protocol messages are exchanged between the app on the user equipment device and a server such as a content server.

The machine learning model 256 may include any suitable model or artificial intelligence module. In some examples, the machine learning model 256 may be a rule-based model or may implement a neural network to identify selected protocol messages of the session between the user equipment device and the content server period. For example, each third-party video streaming service provider may handle streaming of data differently in terms of the amount of content data transmitted at a time and the segment size such as 10 seconds duration or 8 seconds duration. Further each video streaming service provider may establish certain network optimizations. The machine learning model 256 may be trained to identify or recognize session events and other communications for a respective streaming service provider.

The machine learning model 256 may be trained in any suitable manner, using any suitable training data. In a radio access network providing content items to user equipment devices, there is generally a large amount of historical data available from the network. Some portion of this historical data may be used for training the machine learning model 256. For example the training data includes examples of application messages and server messages during sessions for playback of video, for gaming and for other activities. Subscribers access services of many different service providers, for access to video content, gaming content and other content. Some of the messages are encrypted, some are communicated in the clear. In either case, the messages form a pattern of packets created when certain types of application protocol messages are exchanged between an app on a user device and a server of a content provider. The machine learning model 256 is trained to identify such patterns of packets in the messages of a session and draw a conclusion about certain messages. The machine learning model conclusion may be an identification of the content of a message, such as a message based on a user pressing the play button on a user equipment device. The conclusion of the machine learning model 256 may also include a confidence level, such as 90 percent confidence of a correct conclusion.

The machine learning model 256 may be trained to detect any command or pattern of data packets communicated between the user equipment device and the network element. Such commands include a start command, a stop command for video playback and the initiation of video data provided from a content source over the network to the user equipment device.

At step 254, the network element passes received data packets to the machine learning model 256. If the machine learning model determines that one or more packets include a start command, the machine learning model 256 will report the determination to the network element. The machine learning model 256 may make a determination on a probabilistic basis. That is, the machine learning model 256 may determine that, more likely than not, the received data packets define a start command. Alternatively, a threshold value may be set, such as seventy five percent or ninety percent. The machine learning model 256 may report a positive detection of a start command only if the probability exceeds the specified threshold.

Yes, add step 254, the network element does not determine that a start command has been detected, control returns to step 252 to await reception of further data packets from the user equipment device. The method 250 may continue operating in a loop including step 252, step 254 and the machine learning model 256 until a start command is detected.

If the network equipment detects the start command, at step 258, a download operation of the requested video or other content item begins. Download of the requested video may be carried out in any suitable manner. For example, the video may be encoded in any suitable format, such as MPEG4. Further, the content data forming the video stream may be segmented in any suitable manner. In one example, the data is streamed in segments, each segment having a playback duration of 10 seconds. That is, when the segment is played for the user on the user equipment device, the duration of time required to play the segment is 10 seconds. Further, in this example, initially, 5 minutes of video content data is provided from the content source to the user equipment device. The downloaded content data is stored in a buffer memory of the user equipment device. During playback, the user equipment device may retrieve the oldest data (based on timestamp or frame number, for example) from the buffer memory for current playback while the user equipment device is receiving the most recent data and storing the most recent data in the buffer memory. Subsequently, as additional video data is required as the buffer memory drains, the user equipment device sends a request for additional content and additional segments of data are communicated to the user equipment device. The request for additional segments may be sent when the buffer memory is determined to be at a certain data threshold, such as eighty percent empty or only 10 percent remaining, or with content data corresponding to only one minute of playback duration remaining in the buffer memory.

At step 260, when the content data begins downloading, the network element begins counting a watch time. Any suitable technique may be used at a server or other element to track the watch time in a watch time counter. The watch time corresponds to the time duration of playback of the video and corresponds to the ongoing amount of time spent viewing or otherwise consuming the content item by the user of the user equipment device. At step 260, the method 250 may include determining a video start up time corresponding to the difference between the start of the watch time, when download of the content data begins, and the time when the actuation of the start button by the user was detected at step 254.

At step 262, the content server also begins counting a download data time, or a buffer time. Any suitable technique may be used at a server or other element to track the download data time or buffer time. This time corresponds to the amount of playback time that is associated with the amount of content data that has been streamed to the user equipment device. For example, if data is downloaded to the user equipment device in segments, and each segment has a ten second duration when played back on the user equipment device, and six segments are streamed to the user equipment device, the download data time is 60 seconds, or six seconds times 10 seconds per segment. As noted, in one embodiment, initially five minutes of video data is downloaded when a video content item begins playing. Thus, in the example, the download data time is initially 5 minutes.

As noted, as the buffer memory of the user equipment device drains, the user equipment device, or the app operating on the user equipment device, requests additional segments of content data. Any number of content data segments may be sent. In one example, each time a request is received, on additional five minutes of content data, or five minutes of download data time, is streamed to the user equipment device. As the additional content data is streamed to the user equipment device, the download data counter used to count the download data time in step 262 is incremented to maintain a current account of downloaded data.

At step 264, the download data time is compared with the watch time. In an example, contents of the download data counter are compared with the contents of the watch time counter. If, at step 264, the download data time exceeds the watch time, the buffer memory of the user equipment device still has content data available for playback. In the example, if content data corresponding to five minutes of download data time has been streamed to the user equipment device, but only four minutes of watch time has elapsed, the method 250 can conclude that content data corresponding to one minute of download data time remains in the buffer memory. In that case, control returns to step 260 and the content server continues streaming content data while counting the watch time, step 260, and counting the download time, step 262.

The method may continue in a loop including step 260, step 262 and step 264 as data is continuously streamed to the user equipment device and the user continues to view the video on the user equipment. As the buffer memory of the user equipment drains, the user equipment device detects the relative fill level of the buffer memory and automatically requests additional content data from the content server. A series of requests and downloads content data occur, FIG. 2B.

In embodiments, when the requests for additional streamed data are received at the content server from the user equipment device, the requests are recognized by the machine learning model 256. That is, even though the requests may be encrypted by the user equipment device, portions of the requests, including portions of the data packets, are readable and may be used by the machine learning model 256 to identify the packets as forming a request for additional streamed data. As the content server provides data to the user equipment device in response to each received request, the download data counter is incremented, step 262.

At step 264, if the download data time does not exceed the watch time, the buffer memory no longer has data to display to the user watching a video on the user equipment device. For example, the watch time makers on to 11 minutes but the download data time may correspond to 10 minutes. This can either indicate that the playback had stopped at the user equipment device or that a stall has occurred.

At step 266, the content server determines if a stop command has been received from the user equipment device. In the example, the received packets are provided to the machine learning model 256 to identify among the encrypted received data packets from the user equipment device a pattern corresponding to the stop command. The stop command may be issued by the user equipment device, for example, when the user is done watching the video content or pauses playback of the video content by pressing a stop button on the user interface of the user equipment device. If the machine learning model 256 determines that a stop command is received, the machine learning model 256 provides a suitable indication to the content server. The decision or conclusion by the machine learning model 256 may be probabilistic in nature and may indicate a relatively likelihood that the stop command was received. The machine learning model 256 concludes that the stop command has been received. Control then proceeds to step 268 and the stop command is processed by the content server.

On the other hand, if, at step 266, the machine learning model 256 does not conclude that a stop command was received, control proceeds to step 270. The method 250 concludes that, rather than a requested stop by the user, a stall in downloading of steamed data to the user equipment device has occurred, step 270. When video segments are delayed in the network, the video playback app operating on the user equipment device runs out of video chunks downloaded from the server. This corresponds to a stalling and buffering event and is detected by the user as a slight delay in playback or a spinning wheel or other graphical indicator on the user interface indicating that the device is awaiting more data.

The content server and the network may respond to the detected stall in any suitable manner. First, a count of the number of stall events may be maintained. Further, relevant data about each stall event may be collected and stored. For example, the geographical location of the user equipment device and a base station serving the user equipment device, as well as identification information for the base station and the user equipment device may be determined and stored. Further, current network information about the stall event maybe determined and stored. Such information may include relative traffic levels at the base station, number of other user equipment devices attached to the base station at the time of the stall event; occurrence of a handoff or other network event at the time of the stall event, and others.

Based on the collected and saved stall event information, statistical correlations may be drawn to identify sources of stall events or situations associated with a relatively high probability a stall. For example, if it is seen that a video stall occurs when the user equipment device is in a particular geographic location, it may be concluded that the radio access network provides poor coverage to that location. The network provider may respond to such a conclusion by rerouting video traffic to a different base station providing coverage to that location, or by activating carrier aggregation to improve coverage to that location. Similarly, the network provider may adjust beamforming to that particular location to improve coverage.

In another example, the network provider may adjust the quality of service (QoS) class identifier (QCI). To ensure that carrier traffic in mobility networks is appropriately handled, a mechanism is needed to classify the different types of carriers into different classes, with each class having appropriate QoS parameters for the traffic type. Examples of the QoS parameters include Guaranteed Bit Rate (GBR) or non-Guaranteed Bit Rate (non-GBR), Priority Handling, Packet Delay Budget and Packet Error Loss rate. This overall mechanism is called QCI. Each carrier type is assigned a QoS Class Identifier (QCI) by the network. The QCI is used within the radio access network as a reference to node specific parameters that control packet forwarding treatment, for example scheduling weight, admission thresholds and link-layer protocol configuration. Lower-value QCI values are given to higher priority classes of traffic. Thus, conversational voice has the highest priority and is assigned a QCI of 1. Buffered streaming is conventionally assigned a QCI value of 4. However, in response to identification of stall information for a network portion or device, the network operator may modify the QCI for a particular video delivery instance or video delivery environment to give the content item a higher priority in the network or the network portion. For example, if the statistical analysis shows that a user typically streams a video in a particular network location such as a group of cell sites, and typically experiences a stall in that environment, the QCI value for the stream provided to the user in that location may be modified to give the stream a higher priority and reduce the likelihood of a stall. The packets of the stream are moved to a higher priority and are less likely to be delayed to congestion or other factors. This reduces the possibility of a stall and improves the QoE for the customer.

In another example, the network provider may respond to identification of stall information for a network portion or device by dynamically pre-loading content data to the user equipment device. In an example, the statistical analysis may show that a user typically travels through an area covered by a group of cell cites and streams a video in a particular network location including that group of cell sites, and typically experiences a stall in that environment. The network provider may respond by downloading additional content data to the buffer memory of the user equipment device of the user prior to the user's arrival in that particular network location without waiting for the user equipment device to request the additional content data. Such preloading the buffer memory of the user equipment device may reduce or eliminate the necessity of the user equipment device requesting additional content data to replenish the buffer memory when travelling in that network location. This reduces the possibility of a stall and improves the QoE for the customer.

Any other suitable modification may be made by the network operator to reduce the likelihood of a stalling event. For example, the network operator may collect stall event data in near-real time and adjust resource prioritization for each respective subscriber and each respective application used by a subscriber. In an example, the network operator may see that a first subscriber is using a first app to view a video content item in an area susceptive to stall events. Additional network resources may be taken from a second subscriber who currently requires less resources and reassigned to the first subscriber to reduce the likelihood of a stall event occurring for the first subscriber. The second subscriber may be browsing a web page or other activity that requires less data consumption than streaming video to the first subscriber.

In another example, the network operator may improve or optimize video and gaming user experience through real-time detection of video and gaming events and distribution of network resources. In an example, the machine learning model 256 may be trained to recognize one or more particular commands or interactions in the packets exchanged between an app on a user device and a content server or other network destination. Such particular commands may be termed problem requests because, based on historical data collected by the network operator for the network, the problem requests are likely to result in a stall event. If the one or more commands correspond to process likely to cause a stall, or susceptible to a stall, the network operator may redistribute network resources to avoid the stall or minimize the chance of a stall. In a particular example, the user may initiate a video game using augmented reality in which the user is represented by an avatar that interacts with avatars of other users. The machine learning model 256, suitably trained to recognize the video game activities, may provide an indication to the network operator. In turn, the network operator may have information, from past experience or from one or more machine learning models, that a set of interactions between avatars in the video game requires substantial network resources and is liable to create a stall event for the users. In response, the network provider may shift communication between the user and the video game server to an alternative network path that is less likely to be at risk of a stall, perhaps because it has higher data throughput or because it is dedicated to the video game communications for this particular user or group of users. This can operate to deliver an optimal user experience, avoiding the stall event.

In another example, the network operator may work to improve products and services offered by the network operator. In this example, the network operator has knowledge of video QoE for customers based on key performance indicators (KPIs). The network operator monitors activities of users in application sessions and develops a history of KPI requirements to provide a desired QoE for the users. This may be done even when messages of the application session are encrypted or otherwise unavailable to the network operator. A suitably trained machine learning model such as machine learning model 256 or other artificial intelligence component may recognize patterns of user usage which can lead to a stall event or repeated stall event. Based on this information, the network provider may modify a product or service that is likely to cause or be affected by such stall events. For example, if the network operator provides an online gaming service and some aspect of a game is susceptible to stalling, the network operator may modify that aspect of the game to remove or reduce the stalling likelihood.

Further, with collected information about stalling events that occur in a network or network portion, the network operator may adjust network planning and build-out to better utilize resources and to better predict future required capacity. For example, if the network operator, using machine learning model 256 or other artificial intelligence component, detects that a network portion has a disproportionate number of stall events, the network operator may target that network portion for increase of capacity to reduce or eliminate the current stalling for users as well as to reduce the likelihood of future stalling as network demands grows.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
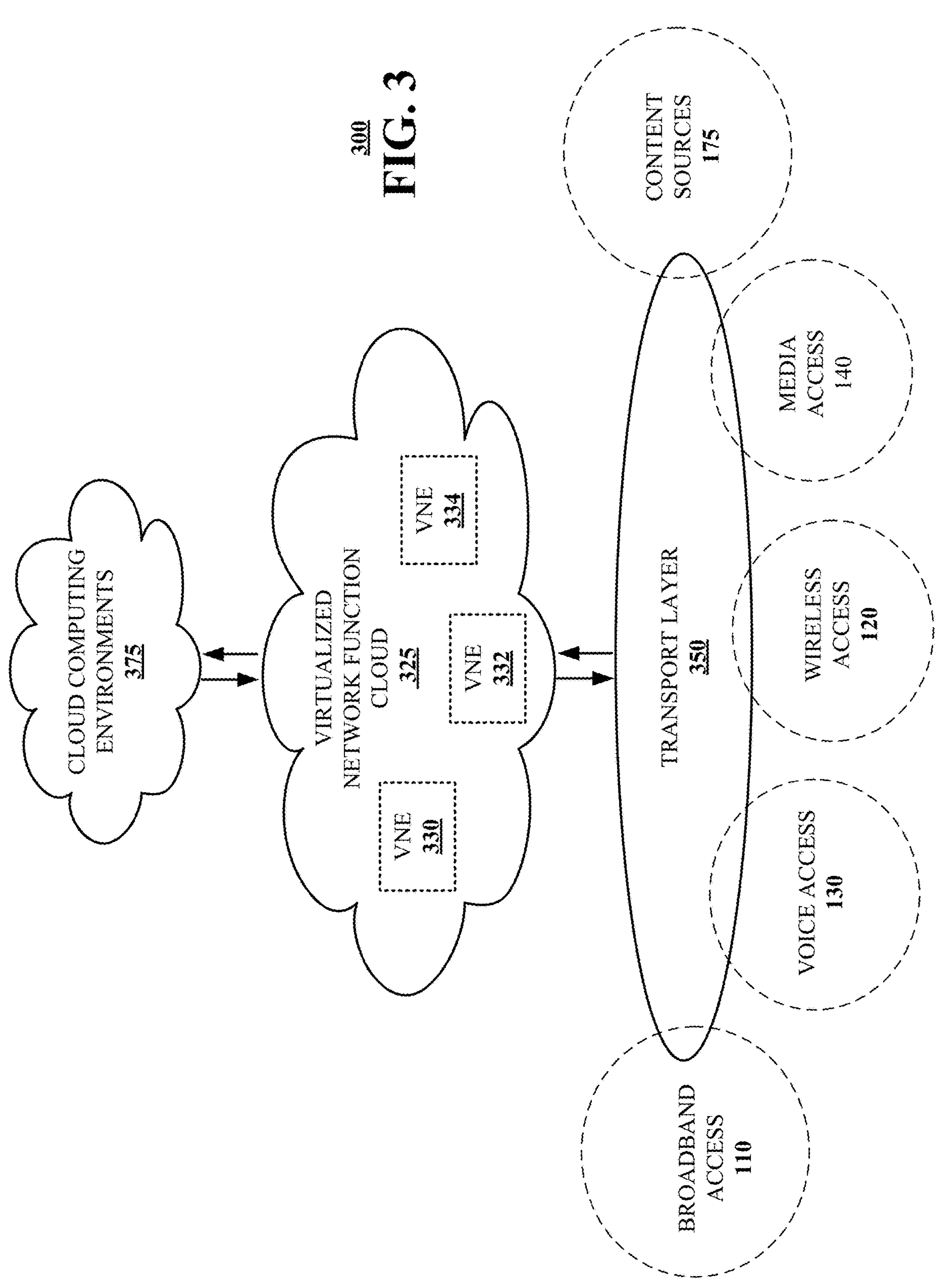
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of method 200, method 220, method 240 and method 250 presented in FIG. 1, FIG. 2A, FIG. 2B, FIG. 2C, FIG. 2D, and FIG. 3. For example, virtualized communication network 300 can facilitate in whole or in part identifying a stall event during content download to a user device through the virtualized communication network 300 and modifying aspects of the network to reduce likelihood of future stall events.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
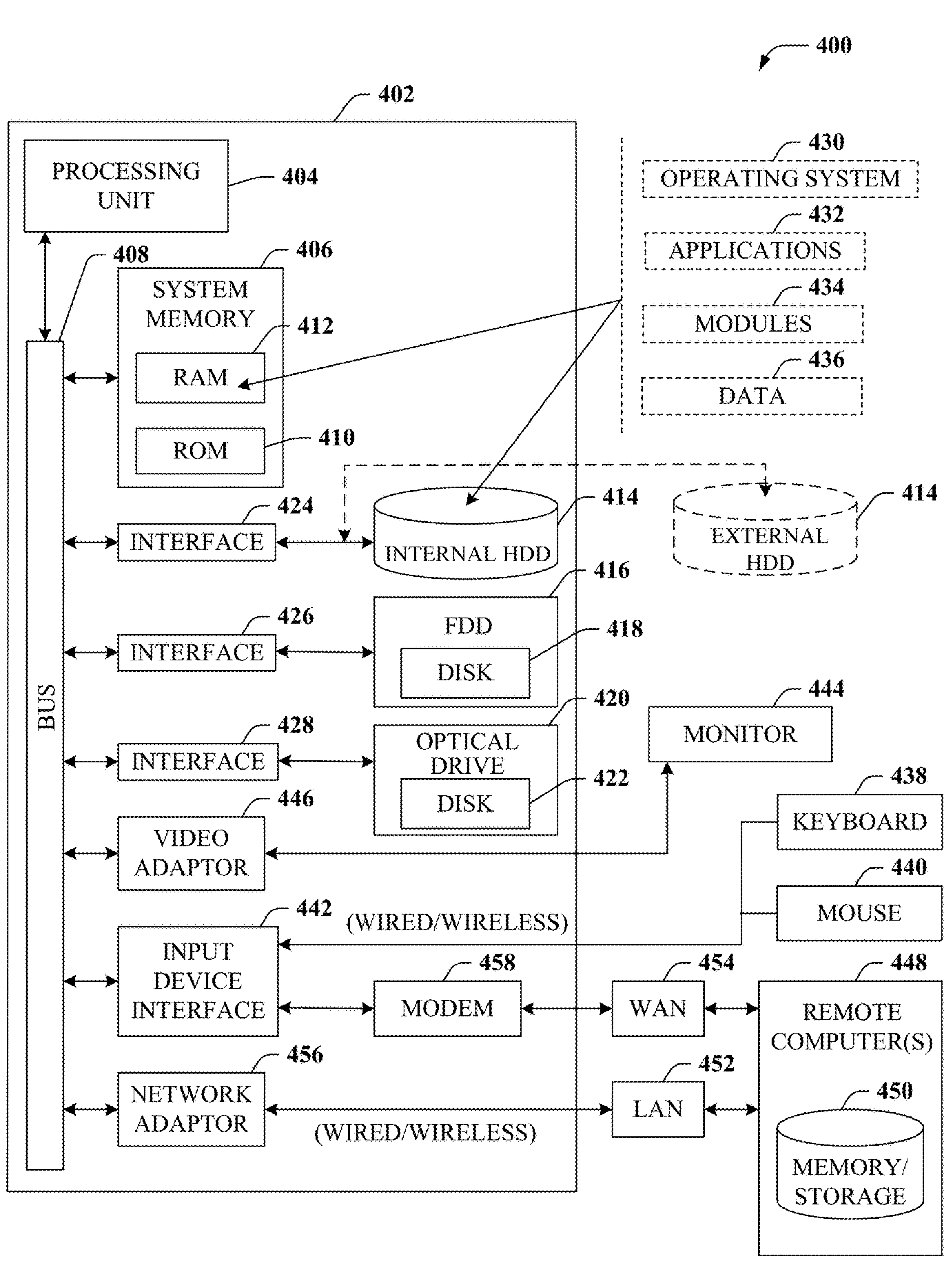
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part identifying, in a machine learning model, application protocol messages in a set of data packets between an application on a mobile device and an application server, even when the data packets are encrypted. Further, the computing environment 400 can facilitate identifying a stall event during content delivery to the mobile device.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
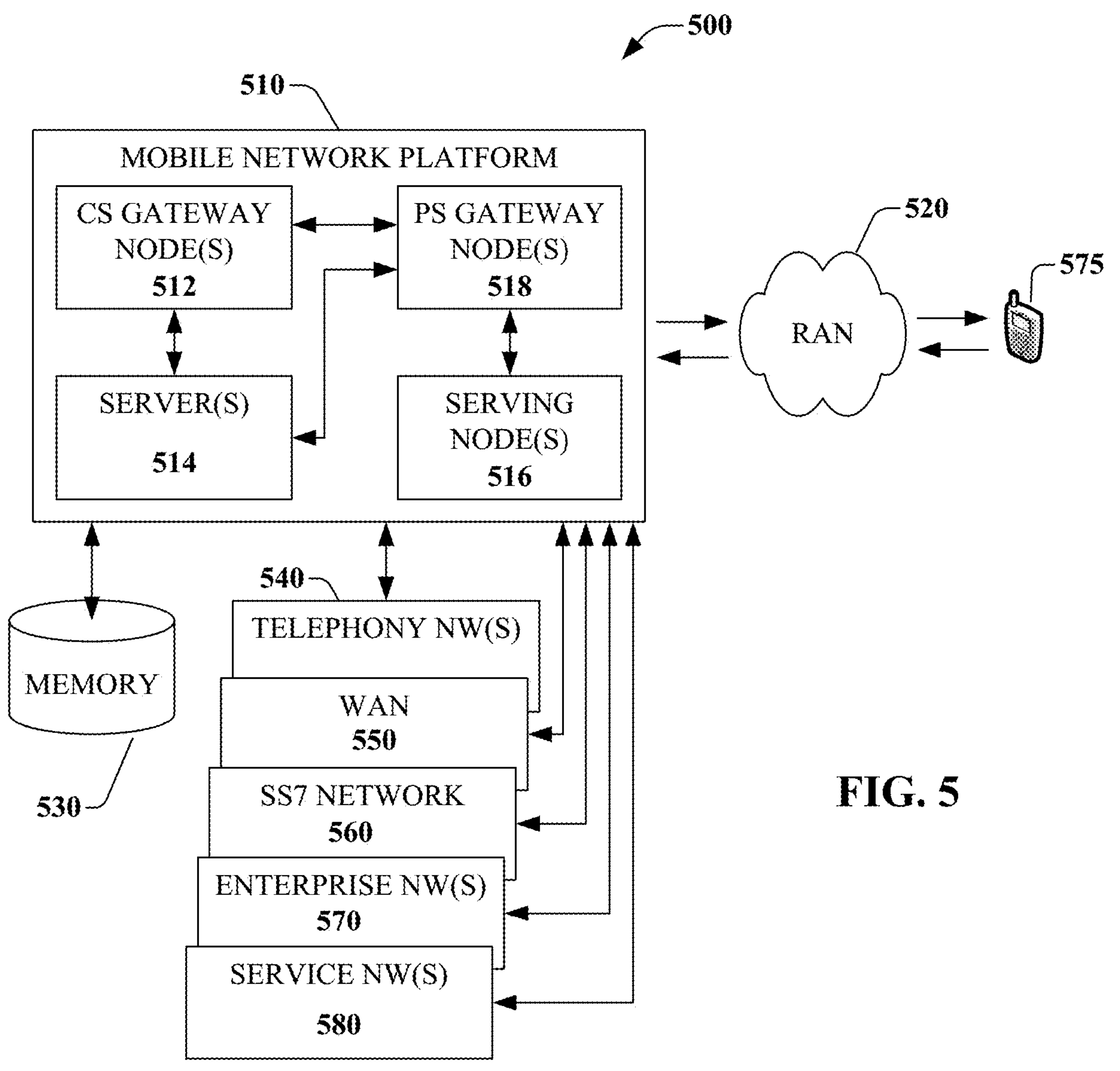
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part identifying, in a machine learning model, application protocol messages in a set of data packets between an application on a mobile device served by the mobile network platform 510 and an application server, even when the data packets are encrypted. Further, the computing environment 400 can facilitate identifying a stall event during content delivery to the mobile device via the mobile network platform 510. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that servers 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
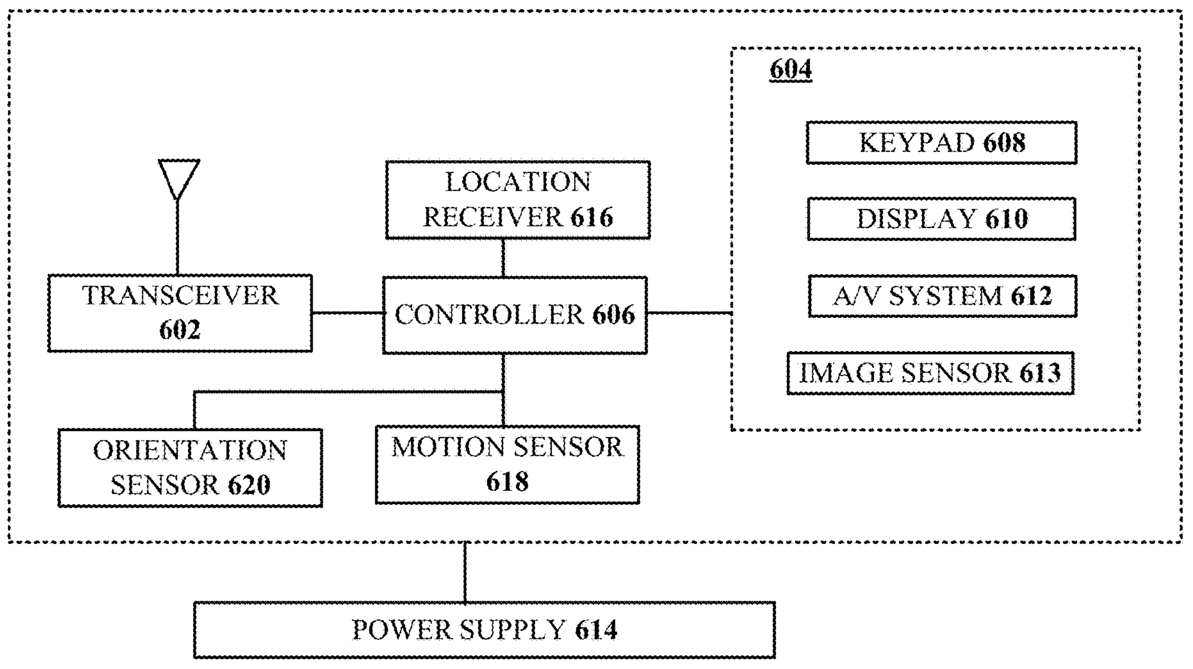
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part identifying, by a machine learning model, application protocol messages in a set of data packets between an application on a mobile device and an application server, even when the data packets are encrypted. Further, the computing device 600 can facilitate identifying a stall event during content delivery to the mobile device.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A non-transitory machine-readable medium, comprising executable instructions that, when executed by a processing system including a processor, facilitate performance of operations, the operations comprising:

detecting uplink packets in a network, the uplink packets conveying application protocol requests from an application on a mobile device to an application server, the application server providing a service to the application on the mobile device over the network, wherein at least some of the uplink packets are encrypted to be readable only by the application server;

detecting downlink packets in the network, the downlink packets conveying content data from the application server to the application on the mobile device for playback of a content item on the mobile device;

reconstructing a session lifecycle into a set of application protocol messages between the application on the mobile device and the application server, wherein the reconstructing is based on the uplink packets and the downlink packets;

identifying a watch time corresponding to a duration of displaying the content data on the mobile device by the application;

identifying a download data time corresponding to an amount of content data downloaded to the application on the mobile device for playback on the mobile device;

comparing the watch time and the download data time;

identifying a stall event in the session lifecycle based on the comparing, wherein the stall event corresponds to an interruption of the playback of the content item on the mobile device due to insufficient content data conveyed from the application server to the application on the mobile device; and redistributing network resources to reduce a likelihood of a future stall event, wherein the redistributing is responsive to the identifying the stall event.

2. The non-transitory machine-readable medium of claim 1, wherein the operations further comprise:

providing at least some of the uplink packets to a machine learning model, the machine learning model trained to identify application protocol messages from the uplink packets;

receiving from the machine learning model an indication that a start video download application protocol message has been identified by the machine learning model, the start video download application protocol message causing an initiation of a download of content data from the application server to the application on the mobile device;

determining a downloaded amount of content data conveyed to the mobile device;

comparing a time duration of playback of content data on the mobile device with a time duration required to play the downloaded amount of content data on the mobile device; and identifying the stall event in the session lifecycle further based on the comparing the time duration of playback of content data with the time duration required to play the downloaded amount of content data.

3. The non-transitory machine-readable medium of claim 2, wherein the operations further comprise:

receiving from the machine learning model another indication that at least some uplink packets correspond to an application protocol message from the application on the mobile device that is likely to cause another future stall event; and redistributing network resources to avoid the another future stall event or to reduce a chance of the another future stall event.

4. The non-transitory machine-readable medium of claim 1, wherein the redistributing the network resources comprises:

providing additional network resources for future downlink packets to the mobile device to prevent or reduce a likelihood of future stall events.

5. The non-transitory machine-readable medium of claim 4, wherein the providing the additional network resources comprises:

moving communication between the mobile device and the application server to an alternative network path that is less likely to be at risk of a stall event.

6. The non-transitory machine-readable medium of claim 1, wherein the operations further comprise:

identifying a plurality of stall events over a set time period; and developing one or more video quality of experience (QoE) metrics for a network portion of the network.

7. A device, comprising:

a processing system including a processor; and a memory that stores executable instructions that, when executed by the processing system, facilitate performance of operations, the operations comprising:

detecting uplink packets in a network, the uplink packets conveying application protocol requests from an application on a mobile device to an application server, the application server providing a service to the application on the mobile device over the network, wherein at least some of the uplink packets are encrypted to be readable only by the application server;

detecting downlink packets in the network, the downlink packets conveying content data from the application server to the application on the mobile device for playback of a content item on the mobile device;

reconstructing a session lifecycle into a set of application protocol messages between the application on the mobile device and the application server, wherein the reconstructing is based on the uplink packets and the downlink packets, and involves providing at least some of the uplink packets to a machine learning model, the machine learning model trained to identify application protocol messages from the uplink packets, receiving from the machine learning model an indication that a start video download application protocol message has been identified by the machine learning model, the start video download application protocol message causing an initiation of a download of content data from the application server to the application on the mobile device, determining a downloaded amount of content data conveyed to the mobile device, and comparing a time duration of playback of content data on the mobile device with a time duration required to play the downloaded amount of content data on the mobile device;

identifying a stall event in the session lifecycle based on the comparing, wherein the stall event corresponds to an interruption of the playback of the content item on the mobile device due to insufficient content data conveyed from the application server to the application on the mobile device; and redistributing network resources to reduce a likelihood of a future stall event.

8. The device of claim 7, wherein the operations further comprise:

receiving from the machine learning model another indication that at least some uplink packets correspond to an application protocol message from the application on the mobile device that is likely to cause another future stall event; and redistributing network resources to avoid the another future stall event or to reduce a chance of the another future stall event.

9. The device of claim 7, wherein the redistributing the network resources comprises:

providing additional network resources for future downlink packets to the mobile device to prevent or reduce a likelihood of future stall events.

10. The device of claim 9, wherein the providing the additional network resources comprises:

moving communication between the mobile device and the application server to an alternative network path that is less likely to be at risk of a stall event.

11. The device of claim 7, wherein the operations further comprise:

identifying a watch time corresponding to a duration of displaying the content data on the mobile device by the application;

identifying a download data time corresponding to an amount of content data downloaded to the application on the mobile device for playback on the mobile device; and comparing the watch time and the download data time, wherein the identifying the stall event in the session lifecycle is further based on the comparing the watch time and the download data time.

12. The device of claim 7, wherein the operations further comprise:

identifying a plurality of stall events over a set time period; and developing one or more video quality of experience (QoE) metrics for a network portion of the network.

13. A method, comprising:

detecting, by a processing system including a processor, uplink packets in a network, the uplink packets conveying application protocol requests from an application on a mobile device to an application server, the application server providing a service to the application on the mobile device over the network, wherein at least some of the uplink packets are encrypted to be readable only by the application server;

detecting, by the processing system, downlink packets in the network, the downlink packets conveying content data from the application server to the application on the mobile device for playback of a content item on the mobile device;

reconstructing, by the processing system, a session lifecycle into a set of application protocol messages between the application on the mobile device and the application server, wherein the reconstructing is based on the uplink packets and the downlink packets;

identifying, by the processing system, a watch time corresponding to a duration of displaying the content data on the mobile device by the application;

identifying, by the processing system, a download data time corresponding to an amount of content data downloaded to the application on the mobile device for playback on the mobile device;

comparing, by the processing system, the watch time and the download data time;

identifying, by the processing system, a stall event in the session lifecycle based on the comparing, wherein the stall event corresponds to an interruption of the playback of the content item on the mobile device due to insufficient content data conveyed from the application server to the application on the mobile device; and based on the identifying, causing, by the processing system, network resources to be redistributed to reduce a likelihood of a future stall event.

14. The method of claim 13, further comprising:

providing, by the processing system, at least some of the uplink packets to a machine learning model, the machine learning model trained to identify application protocol messages from the uplink packets;

receiving, by the processing system and from the machine learning model, an indication that a start video download application protocol message has been identified by the machine learning model, the start video download application protocol message causing an initiation of a download of content data from the application server to the application on the mobile device;

determining, by the processing system, a downloaded amount of content data conveyed to the mobile device; and comparing, by the processing system, a time duration of playback of content data on the mobile device with a time duration required to play the downloaded amount of content data on the mobile device, wherein the identifying, by the processing system, the stall event in the session lifecycle is further based on the comparing the time duration of playback of content data with the time duration required to play the downloaded amount of content data.

15. The method of claim 14, further comprising:

receiving, by the processing system and from the machine learning model, another indication that at least some uplink packets correspond to an application protocol message from the application on the mobile device that is likely to cause another future stall event; and causing, by the processing system, network resources to be redistributed to avoid the another future stall event or to reduce a chance of the another future stall event.

16. The method of claim 13, wherein the causing comprises:

causing additional network resources to be provided for future downlink packets to the mobile device to prevent or reduce a likelihood of future stall events.

17. The method of claim 16, wherein the causing the additional network resources to be provided comprises:

causing communication between the mobile device and the application server to be moved to an alternative network path that is less likely to be at risk of a stall event.

18. The method of claim 13, wherein the causing the network resources to be redistributed comprises causing a quality of service (QoS) class identifier associated with downlink delivery of the content data to be modified to provide a higher priority for the downlink packets, thereby reducing a likelihood of the future stall event.

19. The non-transitory machine-readable medium of claim 1, wherein the redistributing the network resources comprises modifying a quality of service (QoS) class identifier associated with downlink delivery of the content data to provide a higher priority for the downlink packets to reduce a likelihood of the future stall event.

20. The device of claim 7, wherein the redistributing the network resources comprises modifying a quality of service (QoS) class identifier associated with downlink delivery of the content data to provide a higher priority for the downlink packets to reduce a likelihood of the future stall event.

* * * * *